April 19, 1960 W. H. E. SAMUELSON 2,933,628

PIEZO ELECTRIC CRYSTAL HOLDER

Filed Jan. 13, 1956

INVENTOR
WALLACE H.E. SAMUELSON

BY Strauch, Nolan & Diggins

ATTORNEYS

United States Patent Office 2,933,628

Patented Apr. 19, 1960

2,933,628

PIEZO ELECTRIC CRYSTAL HOLDER

Wallace H. E. Samuelson, Carlisle, Pa., assignor, by mesne assignments, to Piezo Crystal Company, Carlisle, Pa., a corporation of Pennsylvania Application January 13, 1956, Serial No. 558,976

7 Claims. (Cl. 310—9.1)

This invention relates to holders for piezoelectric crystals and more particularly to a novel method and/or mounting structure and electrical connections for crystals adapted to be closed in hermetically sealed containers.

In the art of mounting piezoelectric crystals for use in electrical circuits, many arrangements have been devised for meeting the various operating conditions for which crystals have been found useful. The very nature of a piezoelectric crystal requires that the crystal be securely positioned so that it cannot change its physical location but at the same time it must be free to mechanically vibrate. The crystal must also be protected against any chemically active or noxious elements and must be available for final adjustment to frequency after being secured to the mounting structure.

One type of mount commonly used in the past for piezoelectric crystals included a coiled conductor which resiliently gripped opposite edges of the crystal. The electrodes were deposited on opposite faces of the crystal as a conductive layer and each layer had a conductive tab extending to one of the supports to transmit the electrical voltage to the electrodes into the housing through the two electrically conducting support members.

The present invention is adapted for mounting similar crystals in the usual housing by an improved crystal supporting and simplified electrical connecting means. The invention, according to the illustrated embodiment utilizes a pair of molded flexible, chemically inert plastic slabs mounted on the base of the crystal housing which have slots for loosely receiving the opposite edges of the crystals. The crystal is free to vibrate but cannot get out of position. The electrodes are coated on opposite sides of the crystal by evaporation, sputtering, chemical deposition, or in some equivalent manner. A thin silver lead wire is attached to each electrode and the free ends of the lead wires are connected to the main conductors thus providing an improved rugged low cost crystal mount.

It is accordingly a major object of the present invention to provide a mounting for a piezoelectric crystal including a pair of flexible plastic support arms for freely supporting the crystal.

Another object of the invention is to use the electrical conductors in the housing base as reinforcing members for the flexible plastic arms.

Still another object of the invention is to mount the flexible plastic arms to be freely pivotable on the reinforcing members and to be rigidly secured after the crystal is assembled in final position.

It is a further object of the invention to provide caps which are rigidly secured to the electrical conductors to clamp and hold the plastic slab in position.

A still further object of the invention is to utilize each cap which is soldered to the conductors as one terminal for a pigtail lead from the surfaces of the crystal.

Still another object of the invention is to provide an aperture in the crystal holding slot for permitting pigtail leads to be connected to the crystal at points where the crystal is supported.

Another object of the invention is to provide a support that holds the crystal along a diagonal of the crystal housing thus permitting a larger crystal to be mounted in a smaller housing and at the same time providing a symmetrical mounting of the crystal in the housing.

A still further object of the invention is to provide a mount which is of simple construction and low cost to manufacture.

These and other objects of the invention will become more fully apparent from the claims and as the description proceeds in connection with the drawings wherein:

Figures 1, 2, 3, 4, 5, 6, 7:
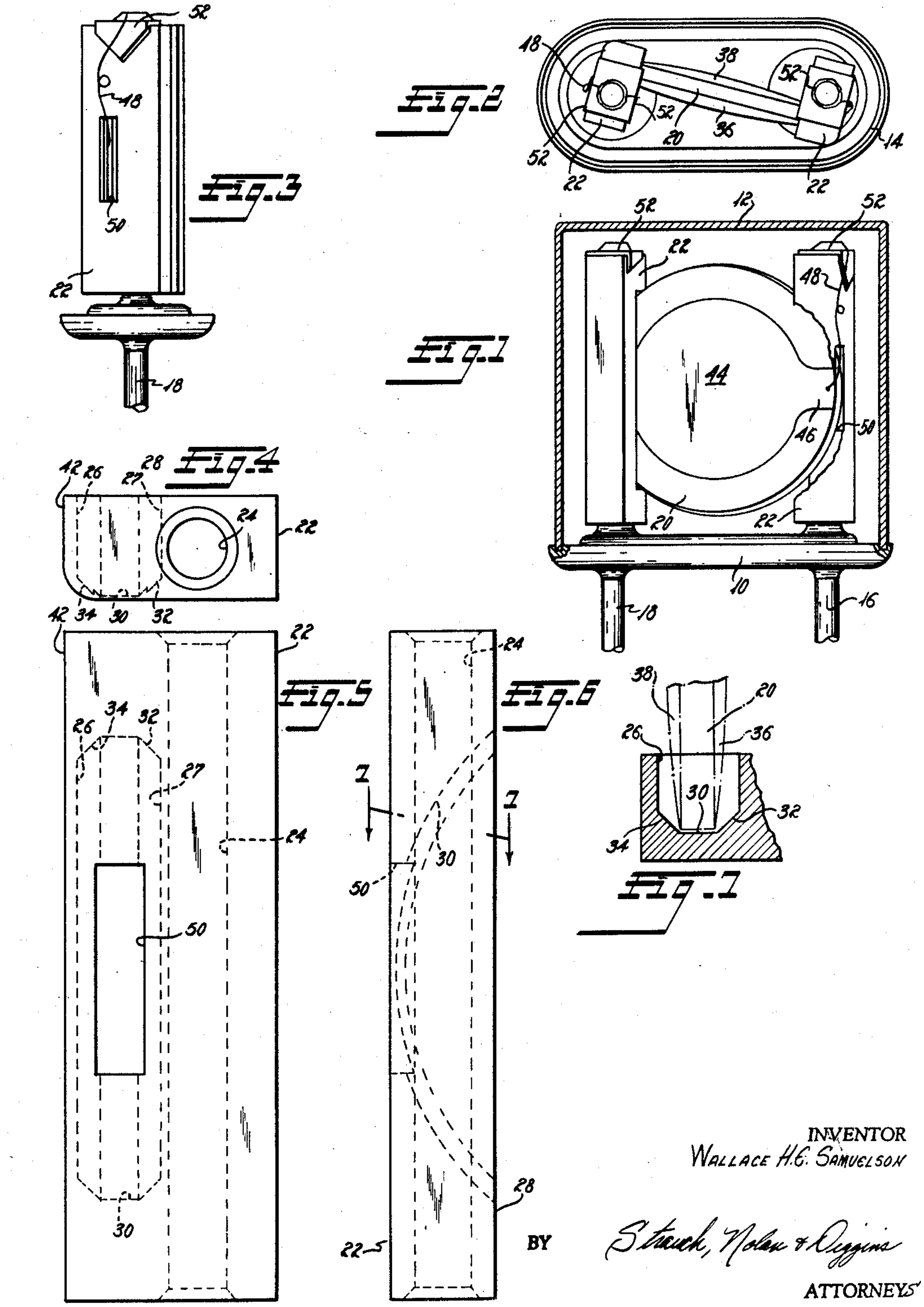
Figure 1 is an elevation view in section of a crystal mounted in a holder in accordance with the present invention.
Figures 2 and 3 are top and side views respectively of the mounting structure shown in Figure 1 with the cover removed.
Figures 4, 5 and 6 are top, front and side views, respectively, of the crystal supporting slab as used in the crystal holder in enlarged scale.
Figure 7 is a sectional view along line 7—7 in Figure 6 with the crystal shown in dotted lines.

The crystal holder according to the illustrated embodiment of the present invention includes a base 10 and cover 12 of metal which are adapted to be sealed together with the bottom of cover 12 received in groove 14 in base 10 as by soldering. Pins 16 and 18, preferably of Kovar, are sealed in and electrically insulated from base 10 as well as being insulated from each other and are electrically connected to opposite faces of crystal 20.

An integral extension of pins 16 and 18 carries crystal suppport members 22, shown greatly enlarged in Figures 4 through 7, which have a through bore 24 slightly larger than the diameter of pins 16 and 18. Support members 22 are formed of a non-conducting flexible material such as a polymerized tetrafluoroethylene which may be manufactured by the process described in United States Patent No. 2,393,967. A preferred material that can be easily molded into the desired dimensions is commercially available as Teflon.

The two support members 22 are constructed identically and have a slot between parallel surfaces 26 and 27 formed in face 28. For disc shaped crystals as illustrated in the described embodiment, the radius of the slot is accurately constructed to match the size of the crystal blank. The radius of curvature of surface 30 is preferably made very slightly smaller than the radius of crystal 20 for a purpose explained below and the width of surface 30 is slightly wider than the edge thickness of the crystal. Surfaces 32 and 34 are beveled at an angle of approximately 45° and extend from surface 30 to surfaces 26 and 27. The distance between surfaces 26 and 27 is almost twice the thickness of the rim of the crystal as these surfaces must be sufficiently separated so that contact with the spherically shaped faces 36 and 38 of crystal 20 as shown in Figure 2 is prevented after the crystal is mounted. As indicated in Figure 7, crystal 20 in dotted lines is thus adapted to be supported on its peripheral edge by surface 30 between bevel surfaces 32 and 34. When the radius of surface 30 is just a slight amount less than the radius of crystal 20, the crystal is better supported on bevel surfaces 32 and 34 and gives superior performance in drop and vibration tests.

Support members 22 are molded in the form of a slab which is preferably as thin as practicable so that the smallest possible container can be used. Thus the thickness of the walls between surfaces 42 and 26 and surface 27 and hole 24 is made as small as possible and in actual practice wall thicknesses in the range of 1/64 of an inch have been found satisfactory. By reversing the end of one support member 22 so that the crystal receiving slot in one of the members is on one side of the central plane through pins 16 and 18 and the slot in the other support member is on the other side of the plane, the crystal is mounted symmetrically about the axis and along a diagonal of the crystal holder. This arrangement permits the largest sized crystal to be mounted in the smallest container and at the same time both support members are molded from the same die.

The electrodes may be placed on the crystal in any desired manner. In the illustrated embodiment the electrodes are in the form of a silver coating 44 on each side of the crystal with a tab extension 46 coated to the edge of the crystal on one side and a similar extension (not shown) coated to the diametrically opposite edge on the other side. Final adjustment to frequency is effected by varying the thickness of the coating. A small lead wire 48, which may be of silver, Phosphor bronze or other similar material, having a diameter in a range of 0.001 to 0.004 inch is secured as by a suitable conductive cement or soldering at one end to each conductive tap 46 on the crystal and is electrically connected at the other end to the respective pins 16 and 18 at caps 52. The preferred lead wire is a Phosphor bronze wire having a diameter of 0.0022 which has been found to provide superior resistance to failure caused by fatigue.

Since the mechanical support of the crystal is supplied entirely by members 22, it is preferable to provide a slot 50 on the end wall of member 22 through which lead wire 48 passes. The width of slot 50 is slightly larger than the rim thickness of the crystal thereby permitting lead wire 48 to be directed outside support member 22 through slot 50.

Caps 52 frictionally clamp opposite sides of support members 22 and are apertured to fit over the ends of pins 16 and 18. After support members 22 are placed on pins 16 and 18, one of the end caps may be soldered to its respective pin 16 or 18 thereby rigidly securing its associated support member against pivotal movement. The crystal is mounted in its approximate position with one edge of the crystal in the slot of the fixed support member. The other support member is then pivoted into its final position which is just shy of the point where a compressive force is applied to the crystal and solder is applied to end cap 52 thereby securing the support member against further pivotal movement. The ends of pigtails 48 are brought through slots 50 as the crystal edges are placed in position and are secured to caps 52 or pins 16 and 18 as by soldering.

It is to be understood that this invention can be used with other sizes and shapes of crystals and with different types of crystal containers. For non-circular crystals, either a circular or non-circular slot is formed in the crystal supporting slabs. The crystal does not have to be supported along an entire edge on the resilient material as a support at two or more points on the periphery of the crystal is satisfactory where severe drops and vibration is not encountered. The resonance of the crystal is thus affected only a minimum amount while at the same time the crystal is safely secured in its desired position in the container and protected from mechanical shock transmitted to the crystal from the outside of the container. By providing a die for molding the support members for each different size of production crystals, the improved mount according to the present invention can be easily and inexpensively produced.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a housing having a piezoelectric crystal, a base, a pair of parallel spaced rigid electrical conductors extending through said base, a member composed of flexible plastic material mounted for pivotal movement about each conductor, a slot in each of said members parallel to and spaced from the supporting conductor for freely carrying said crystal therebetween, means securing said members to prevent said pivotal movement after the crystal is positioned in said slots, and electrically conducting means connecting the conductors to said crystal.

2. In a hermetically sealed housing containing a piezoelectric crystal: a base; a pair of spaced electrical conductors extending through the base; a slab of resilient plastic material, having a bore extending longitudinally therethrough, carried by each of said conductors on one side of said base, the conductors extending through the respective bores; each of said slabs having a slot parallel to and displaced from its bore to freely receive and support the crystal along a peripheral edge; and electrical conductor means connecting said crystal to said pair of electrical conductors.

3. In the support defined in claim 2, a cap of electrically conducting material clamped on each slab at the end thereof and rigidly secured to said electrical conductors.

4. In the support defined in claim 2 further having an aperture at each slot through which each of said electrical conductor means extends.

5. In a holder containing a piezoelectric crystal having a base and a cover; a pair of rigid electrical conductors extending through said base and defining a first plane; a slab of resilient plastic material mounted on each of said conductors under said cover; each of said slabs having a slot in a plane substantially parallel to the axis of the electrical conductor in said slab with the open side of the slots in each slab facing each other and lying on opposite sides of said first plane for receiving said crystal; and conducting means electrically connecting said crystal to each of said pair of conductors.

6. In the holder as defined in claim 5, a cap on each of said slabs rigidly secured on one end of each of said pair of conductors, said conductor means being connected to said caps.

7. In a crystal assembly comprising a base; a pair of electrically conductive posts extending through said base; a pair of flexible supports of inert plastic non-conducting material surroundingly mounted over said conductive posts; said supports having longitudinally extending grooves located off-center on facing surfaces; a piezoelectric crystal disposed between said posts with opposite edges in said grooves serving as the sole support for said crystal; and flexible electric conducting means connected between said crystal and said conductors.

References Cited in the file of this patent

UNITED STATES PATENTS

| | | |
|---|---|---|
| 2,471,625 | Johnstone | May 31, 1949 |
| 2,676,275 | Bigler | Apr. 20, 1954 |
| 2,677,775 | Font | May 4, 1954 |
| 2,705,760 | Minnich | Apr. 5, 1955 |
| 2,784,326 | Purdue | Mar. 5, 1957 |
| 2,802,955 | Kitterman | Aug. 13, 1957 |